(12) United States Patent
Subbaraman et al.

(10) Patent No.: US 7,451,347 B2
(45) Date of Patent: Nov. 11, 2008

(54) FAILOVER SCOPES FOR NODES OF A COMPUTER CLUSTER

(75) Inventors: Chittur P. Subbaraman, Carnation, WA (US); Sunita Shrivastava, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 661 days.

(21) Appl. No.: 10/962,010

(22) Filed: Oct. 8, 2004

(65) Prior Publication Data

US 2006/0080568 A1 Apr. 13, 2006

(51) Int. Cl.
G06F 11/00 (2006.01)

(52) U.S. Cl. .................. 714/10; 714/8; 714/47; 714/746

(58) Field of Classification Search .............. 714/10, 714/8, 47
See application file for complete search history.

(56) References Cited

U.S. PATENT DOCUMENTS

| | | | |
|---|---|---|---|
| 6,438,705 B1 * | 8/2002 | Chao et al. ............... | 714/4 |
| 6,789,213 B2 * | 9/2004 | Kumar et al. ............. | 714/13 |
| 6,857,026 B1 * | 2/2005 | Cain ........................ | 709/239 |
| 6,990,606 B2 * | 1/2006 | Schroiff et al. ............ | 714/7 |
| 7,039,827 B2 * | 5/2006 | Meyer et al. ............. | 714/4 |
| 7,055,053 B2 * | 5/2006 | Saika ....................... | 714/4 |
| 7,188,273 B2 * | 3/2007 | Allen et al. .............. | 714/6 |
| 7,210,088 B2 * | 4/2007 | Chen et al. ............... | 714/746 |
| 7,225,356 B2 * | 5/2007 | Monitzer .................. | 714/12 |
| 7,234,073 B1 * | 6/2007 | Roytman et al. ......... | 714/4 |
| 2002/0095470 A1 * | 7/2002 | Cochran et al. .......... | 709/208 |
| 2002/0188711 A1 * | 12/2002 | Meyer et al. ............. | 709/223 |
| 2002/0198996 A1 * | 12/2002 | Sreenivasan et al. .... | 709/226 |
| 2004/0010502 A1 * | 1/2004 | Bomfim et al. .......... | 707/100 |
| 2004/0122935 A1 * | 6/2004 | Blam et al. .............. | 709/223 |
| 2004/0139151 A1 * | 7/2004 | Flurry et al. ............. | 709/203 |
| 2004/0199811 A1 * | 10/2004 | Rathunde et al. ........ | 714/10 |
| 2005/0015683 A1 * | 1/2005 | Clark et al. .............. | 714/48 |
| 2005/0102562 A1 * | 5/2005 | Shinohara et al. ....... | 714/15 |
| 2005/0138517 A1 * | 6/2005 | Monitzer .................. | 714/746 |
| 2005/0193104 A1 * | 9/2005 | Mason et al. ............ | 709/223 |

* cited by examiner

Primary Examiner—Scott T. Baderman
Assistant Examiner—Loan Truong
(74) Attorney, Agent, or Firm—Workman Nydegger (57) ABSTRACT

A failover scope comprises a node collection in a computer cluster. A resource group (e.g., application program) is associated with one or more failover scopes. If a node fails, its hosted resource groups only failover to nodes identified in each resource group's associated failover scope(s), beginning with a first associated failover scope, in order, thereby defining an island of nodes within which a resource group can failover. If unable to failover to a node of a resource group's first failover scope, failover is attempted to a node represented in any next associated failover scope, which may require manual intervention. Failover scopes may represent geographic sites, whereby each resource group attempts to failover to nodes within its site before failing over to another site. Failover scopes may be managed by the cluster runtime automatically, e.g., an added node is detectable as belonging to a site represented by a failover scope.

30 Claims, 6 Drawing Sheets

FAILOVER SCOPES FOR NODES OF A COMPUTER CLUSTER

FIELD OF THE INVENTION

The invention relates generally to clustered computing nodes, and more particularly to handling failures of applications or the hosting nodes of a cluster.

BACKGROUND

A cluster is a set of interconnected computer system servers arranged as nodes that provide access to resources such as server application programs. One reason to have a server cluster is that multiple linked computer systems significantly improve computing availability and reliability, as well as having more processing power, speed and other resources by way of distributing the load.

With respect to availability and reliability in a cluster, if one node or a hosted application fails, its resources failover to other surviving nodes, where in general, failover means that the other nodes provide host applications that correspond to those that were previously provided by the now-failed node. Types of failures include a computer system crash, a break in a communications link between nodes, intentional shutdowns for maintenance or the like, inadvertent shutdowns such as accidentally unplugging power or a communications cable, and so on.

To handle failures in some controlled way so that failed applications properly restart on other nodes, one attempt was made to have groups of resources (each referred to as a resource group, which is a collection of one or more resources such as application programs and related resources such as network names, IP addresses and the like that is managed as a single unit with respect to failover) failover to a preferred node based on a list of preferred nodes. However, this tended to overwhelm certain nodes because many resource groups had the same default configuration for their preferred nodes. To avoid this problem, present clustering technology provides that when more than one surviving node is available, an algorithm based on random numbers is used to choose the destination node for resource groups if no configuration is provided for the preferred owners list for a resource group (at least among nodes that are capable of hosting the groups), so that no one node is overwhelmed by taking on too many resource groups of the failed node or nodes.

With respect to computing power/speed, physically close computing systems in a cluster are typically linked by very high bandwidth network connections. However, not all cluster nodes are physically close, as enterprises (particularly large enterprises) often separate two or more subsets of such closely-interconnected clustered nodes from one another by relatively large geographic distances. A purpose of this is disaster protection, so as to still have some number of nodes operating in the event of a hurricane, fire, earthquake or the like that can cause an entire physically close subset of interconnected nodes to fail as a whole, whether the reason for the failure is the actual failure of the nodes, or a break in the transmission medium between that subset of nodes and other distant nodes.

A problem with disaster protection by geographic separation is that the communications bandwidth between one subset of closely-interconnected nodes with that of another subset is far lower than the communications bandwidth within the subset. As a result, some cluster administrators do not necessarily want resource groups to automatically failover from one closely-interconnected subset to another (unless an entire subset fails), because the time and expense of failing over resources from even one node is significant, given the low-bandwidth connection. Instead, cluster administrators often would prefer to have the resource groups failover only to closely interconnected nodes. In the event that an entire subset fails, some administrators would prefer to assess the cause and fix the problem (e.g., an unplugged cable) if possible, and only manually failover the resource groups if necessary, which may require some reconfiguration of the other subset to accept the failed over resource groups. Still other administrators want failover to be automatic, at least to an extent, if an entire subset fails. Further, when dealing with consolidation clusters, which are clusters hosting multiple applications, many administrators would like to constrain the set of nodes on which an application composed of various components may be hosted.

However, with the above-described random failover mechanism that was heretofore in place, as well as other prior mechanisms, administrators are not able to configure their clusters for failover in the way that is desired. In fact, with the random mechanism there is no distinction between physically close or physically distant nodes when failing over resource groups. What is needed is a flexible way for cluster administrators to manage the automatic actions that a cluster will take on failures.

SUMMARY OF THE INVENTION

Briefly, the present invention is directed towards a system and method by which a failover scopes are defined, each comprising a subset of identified nodes of a cluster, and by which resource groups may be associated with an ordered list of one or more failover scopes. When a failover occurs, each resource group automatically fails over to a surviving node that is listed within its failover scope. Based on the ordering, until successful, failover will be first attempted to each of the nodes within the current active failover scope before attempting failover to any node in the next failover scope.

If no node within the first failover scope is able to accept the failover, (e.g., none have survived), the resource group may be set to automatically failover to a node listed in the next failover scope, and so on until no fail. To give the administrator the ability to prevent such automatic failover to a node of another failover scope, a manual setting (e.g., a manual/automatic flag) is set that prevents an automatic failover to a subsequently listed failover scope. There may be one such flag per pair of failover scopes associated with a resource group, (e.g., two flags for three failover scopes, one that establishes manual or automatic transition from the first to second failover scope and one that establishes manual or automatic transition from the second to third failover scope), or there may be one such flag for the entire resource group. The flags default to manual, and may be individually set by an administrator or set for the resource groups of the entire cluster as a whole.

A failover scope may be established for each subset of nodes as separated on a geographic basis, referred to as a site. Each site generally comprises closely (relatively high-bandwidth) interconnected nodes that make up one subset of a cluster. However, failover scopes need not correspond exactly to a site, and thus a failover scope can span more than one site.

Alternatively, a failover scope may be defined to encompass only some subset of a site, e.g., as little as one node in a site having two or more nodes. This allows an administrator to constrain the set of nodes on which any resource group may be hosted, such as an application program composed of various components.

When a node is added to a site, the new node is automatically recognized, as part of running a setup program that requests that the node be added to the cluster. If the cluster software is so configured, an automated process based on distance detection may add the node to a failover scope that corresponds to the site. In this manner, the administrator does not have to update the failover scope for a new node. However, regardless of whether the automated process associates the new node with a failover scope or the administrator adds the new node to a failover scope (or more than one) manually, the resource groups that are associated with that failover scope, which may be a relatively large number, need not be configured to be able to run on the new node.

Other advantages will become apparent from the following detailed description when taken in conjunction with the drawings, in which:

DETAILED DESCRIPTION

Exemplary Operating Environment

Figure 1:
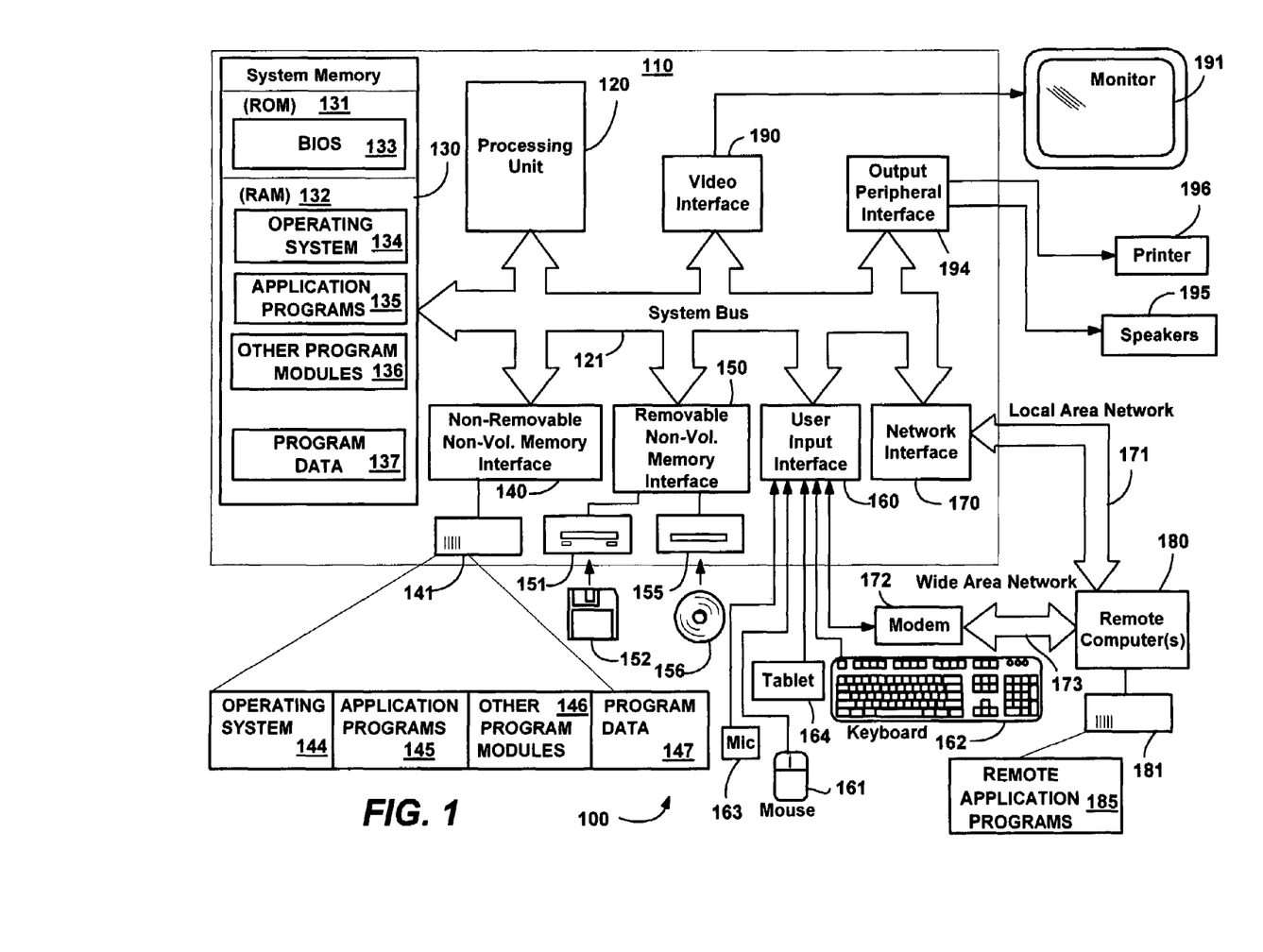
FIG. 1 is a block diagram generally representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Failover Scopes

The present invention is generally directed towards a system and method by which the failover of resource groups (e.g., due to failure of a computer node) is handled in a way that is predetermined by an administrator. As will be understood, numerous ways to implement the present invention are feasible, and only some of the alternatives are described herein. For example, the present invention is described below with reference to a cluster node that acts as a leader in determining which resource groups are failed over to which nodes based on maintained failover scope information in the form of a simple list, however other mechanisms are feasible. For example, having nodes bid for resource groups, in which failover scope data is only one factor, is a feasible alternative. As such, the present invention is not limited to any particular examples of failover scopes used herein, but rather the concept of failover scopes may be used various ways that provide benefits and advantages in computing in general.

Figure 2:
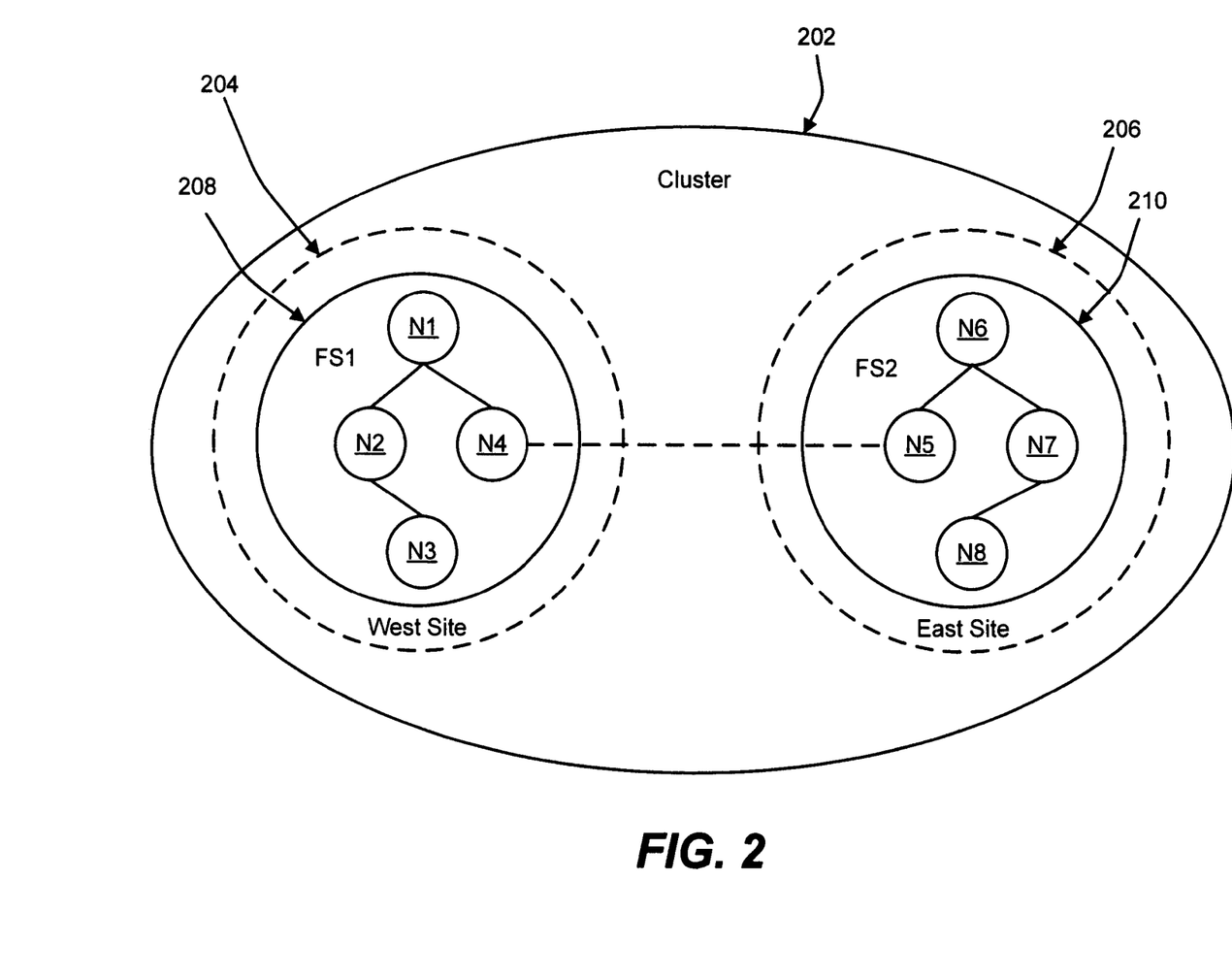
FIG. 2 is a block diagram generally representing an example cluster comprising two geographically separated sites and having defined failover scopes, in accordance with various aspects of the present invention.

Turning to FIG. 2 of the drawings, there is shown an arrangement of nodes N1-N8 in a cluster 202, which are separated into two geographical sites, such as a "West" site 204 and an "East" site 206. A general rule is that within a site, the communication media between nodes are very high-bandwidth (shown as the solid slanted lines connecting nodes N1-N4 and N5-N8) relative to the connection between nodes of different sites, shown as the dashed line between the nodes N4 and N5. For example, nodes within a site may be connected via fast network connections, whereas nodes of separate sites may be connected via a virtual private network over the Internet. Typically one site is geographically distant from another site, however it may be useful to define sites based on other factors, such as bandwidth considerations, which may be independent of the actual physical distance between nodes.

In accordance with an aspect of the present invention, there is defined a first failover scope (FS1) 208 for one set a nodes N1-N4 and a second failover scope (FS2) 210 for another set of nodes N5-N8. The definitions as to which nodes belong to which failover scope may be made by an administrator or by an automated process (described below). In the example of FIG. 2, with respect to node identities, the failover scopes 208 and 210 correspond exactly to the sites 204 and 206, respectively. However as described below with reference to FIGS. 5 and 6, this is not a requirement, and indeed, a failover scope may span multiple sites and/or a failover scope may include less than all of the nodes of a site (which may be typical).

Figure 3:
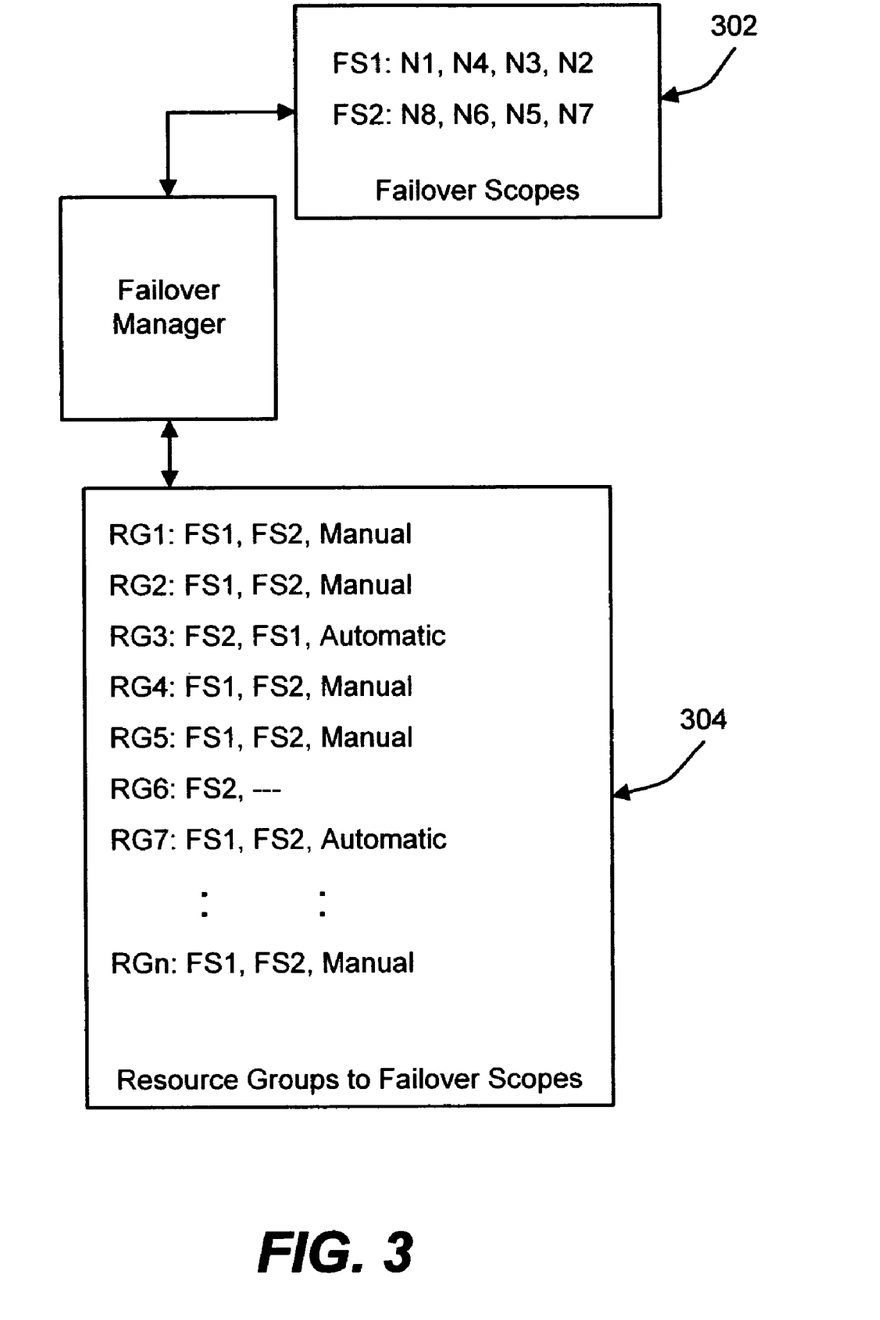
FIG. 3 is a representation of the failover scopes of FIG. 2 comprising failover scopes listing one or more nodes, and lists of resource groups and their association with failover scopes, in accordance with various aspects of the present invention.

In general, each resource group is associated with at least one failover scope. FIG. 3 shows the node identities for the failover scopes FS1 and FS2 of FIG. 2, with each failover scope identity having a list of node identities that belong to that failover scope, such as maintained in a data structure 302. Also shown is an example set of resource group identifiers RG1-RGn listing their associated failover scopes, such as maintained in another data structure 304.

In accordance with an aspect of the present invention, a resource group is only failed over to a node listed in its associated failover scope or scopes. In one implementation, a resource group is not required to have an association with a failover scope, in which event that resource group can be failed over to any node in the cluster (as long as that node can accept the resource group due to other considerations). To prevent a resource group from being failed over, (such as with a power-hungry program that only can be run on one very powerful node of the cluster), the resource group can be associated with a failover scope comprising only a single node; if that node fails, there will be no other node to failover the resource group to and an automatic restart process or the administrator will have to restart the node and/or reconfigure the failover scope for that resource group. Note that it is feasible (though unlikely) to have a failover scope that does not include the node (e.g., node X) on which a resource group is running; failover can then be to another node, (e.g., node Y), but not later back to the node on which it was previously running (node X) unless the administrator manually intervenes. This would require that the administrator or a startup process start the resource group on a node that was not listed in the failover scope.

In any event, if a resource group that is to be failed over is associated with more than one failover scope, as is common, there is an ordering of failover scopes for attempting the failover. For example, with reference to the data structure 304 of FIG. 3, the resource group RG1 is set to first fail over to a node within the first failover scope (FS1) 208 of FIG. 2; only if no node within that failover scope is able to handle the failover will failover to a node in the second failover scope (FS2) 210 be attempted; in other words, precedence is maintained across the failover scopes. In one alternative, if the whole failover scope's nodes fail, another node may be selected from another failover scope associated with that group based on some criteria other than ordering, e.g., current load, capability to host the resource group, bandwidth, and other metrics. Note that if a node to which a resource group is failed over itself fails, then the failover manager will first try to failover the group to some other node within that failover scope (although all nodes in that scope may be dead).

Note that failover within a scope is automatic, (generally for the purposes of maintaining high availability levels), however before failing over to a second scope, a flag (with a value represented as "Manual" or "Automatic" in FIG. 3 but requiring as little as a single bit) controls whether the failover is manual or automatic for a given resource group across failover scopes. That is, when the flag is set to manual, manual intervention is required to bring the resource group online on the surviving failover scope. Further, note that multiple failover scopes are ordered, however the list of nodes in a failover scope need not be ordered. Instead, nodes may be chosen randomly, or in some other appropriate manner, such as based on load-balancing criteria. However, an administrator may set a favored node ordering within a failover scope, such as by selecting according to node ordering and then having different failover scopes for each ordering. For example, if ordered node selection was active, FS1 is shown in FIG. 3 as being ordered as N1, N4, N3, N2; a new failover scope, FS13 (not shown), may be defined with the same nodes N2, N3, N4, N1. The administrator may then associate one resource group with FS1 and another resource group with FS13, whereby the resource groups typically will failover to different nodes, but will still failover within the same subset of nodes. In general, the user does not need to set the preferred list for a group, as internally, the cluster nodes are listed in the preferred list in a random order. The nodes that cannot host resources within that group are pruned from this list. However, the user may set the group preferred list to a particular order if the user wishes to have more control over group placement.

Figure 4:
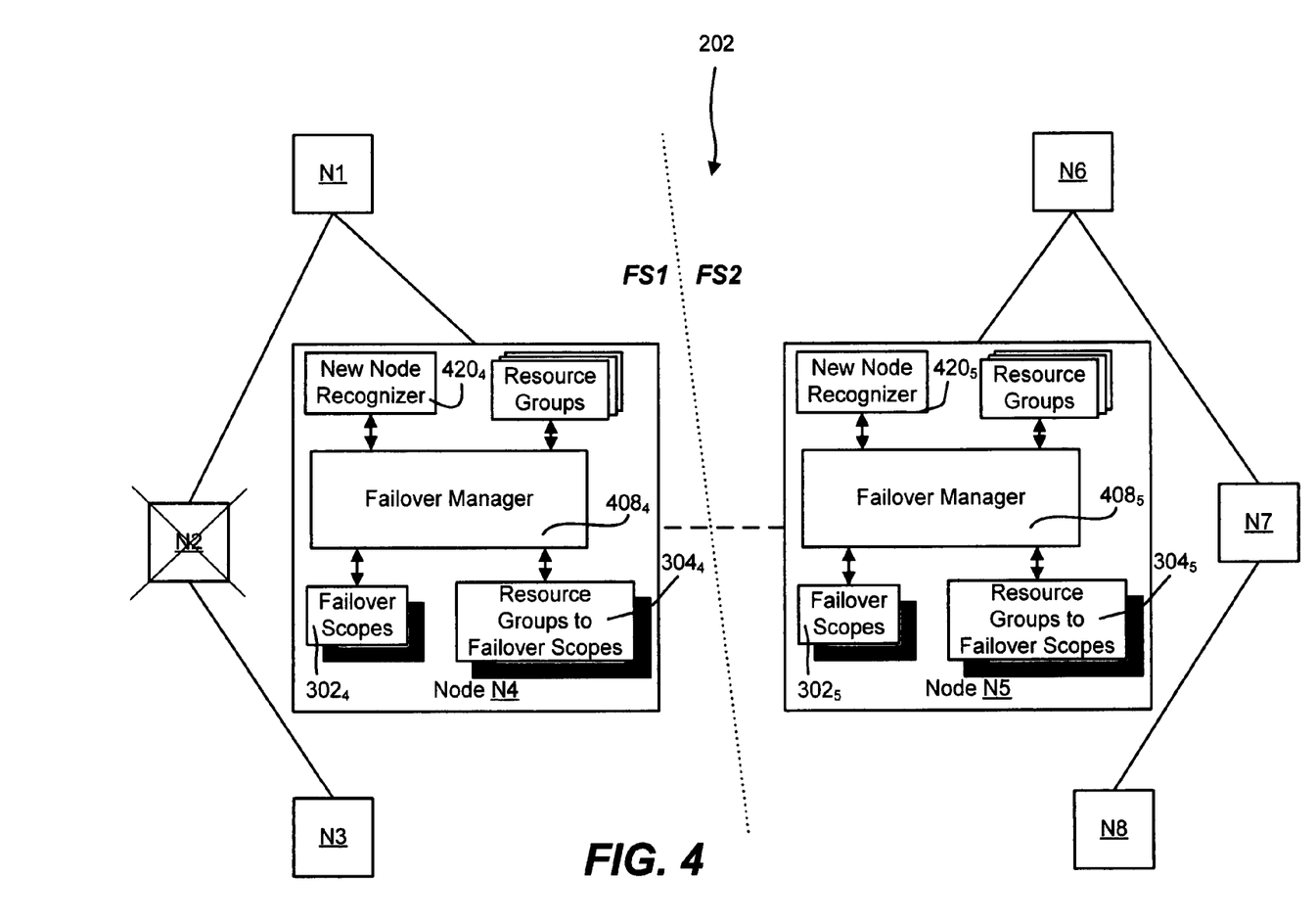
FIG. 4 is a block diagram generally representing example cluster nodes each having a failover manager for handling failovers in a controlled manner via failover scopes, in accordance with various aspects of the present invention.

Failover generally works via components represented in FIG. 4, wherein the cluster 202 of FIG. 2 is shown in a slightly different manner, with two of the nodes (N4 and N5) having some of their internal components and data structures revealed, mainly those used for failover. Note that the other nodes N1-N3 and N6-N8 have similar components and data structures, but these internal items are not separately shown. Further consider that node N2 has failed, as indicated by the diagonal lines crossing out the node N2, and thus that the node N2's resource groups need to be failed over. Note that it is possible that a resource group can fail and thus be failed over even though its node is still operating; e.g., a resource group may be moved to another node by intentionally causing a failover, such as for testing purposes.

When a node fails, each node in the cluster knows of the failure. For example, one way a node failure may be detected is that the failed node stops responding to regular ping messages, or alternately, fails to send out periodic heartbeat messages. As such information is regularly communicated to the nodes of a cluster, the surviving nodes know of the failure.

In one implementation, one of the nodes is a leader node that controls the failover; (note that if the leader node fails another node accedes as a new leader, so a leader node is always present as there is at least one healthy node in the cluster). The leader node controls (or delegates to another node control of) the failover operation to ensure that for each resource group to failover, the failover operation is first attempted according to the failover scope ordering for that resource group. To this end, each node has a failover manager (sometimes referred to as a resource control manager), along with the data structures maintaining the failover scopes and the resource groups to failover scopes associations. The failover manager works to restrict the failover of the resource groups to the nodes contained within the resource group's associated failover scopes, in order of the failover scopes. In the example of FIG. 4, for the node N4, the failover manager is labeled $408_4$, the failover scopes data structure $302_4$ and the resource groups-to-failover scopes associations data structure $304_4$, with similar items labeled with subscript "5" for node N5. Note that although not shown in FIG. 4, a "resource manager" may provide a hosting environment for a resource, in which event the failover managers provide control orders directed to the resources via their appropriate resource managers.

As can be readily appreciated, various embodiments that include the failover scopes of the present invention may be implemented. For example, in one implementation, the failover manager may enforce rules to ensure that the failover scopes associated with a resource group are non-intersecting, that is, disjoint. Alternatively, if this is not enforced by the failover manager, this is allowed and will work because the failover manager makes decisions based on the configuration. Further, the failover manager may first determine the ability of a node to host a resource group, either automatically if possible, or with some input from the administrator. For example, an automatic decision may be made based on whether a candidate node contains a copy of the resource group's binary code. Note that an application corresponding to a resource group may be installed on some nodes of a cluster but not the others; e.g., user input might be necessary in deciding whether an application needs to use some special capabilities (such as multiprocessor support) associated with a subset of nodes.

Failover scopes may be created manually, e.g., by invoking APIs that the cluster runtime supports. As a result, the failover scopes do not necessarily have to represent sites, as described below with reference to FIGS. 5 and 6. Failover scopes may be used to define an island of nodes within which an application can fail over.

Failover scopes that represent sites may be automatically created because the underlying networking infrastructure has some notion of distance between nodes; note that known algorithms which determine distance based on communication times may be used for distance detection. If the cluster software is so configured, an automated process based on distance detection may add the node to a failover scope that corresponds to a site. To this end, represented in FIG. 4 is a component $420_4$ (or $420_5$) that automatically recognizes when a new node is added to a cluster; one such component is a setup program that is run when adding a new node. In this manner, the administrator does not have to update a failover scope for a new node for any failover scope that matches a site. However, regardless of whether the automated process associates the new node with a failover scope or the administrator adds the new node to a failover scope (or more than one) manually, the resource groups that are associated with that failover scope, which may be a relatively large number, need not be changed to be able to run on the new node.

As shown in the example of FIGS. 2-4, a cluster may be comprised of multiple sites, (sometimes referred to as a geo-cluster), with each site comprising a collection of nodes. As in this example, the failover scopes configured for a resource group in such a cluster are often defined along site level boundaries, and in practice will likely be used this way. However, implementations of the present invention do not prevent a failover scope from spanning a site.

Figure 5:
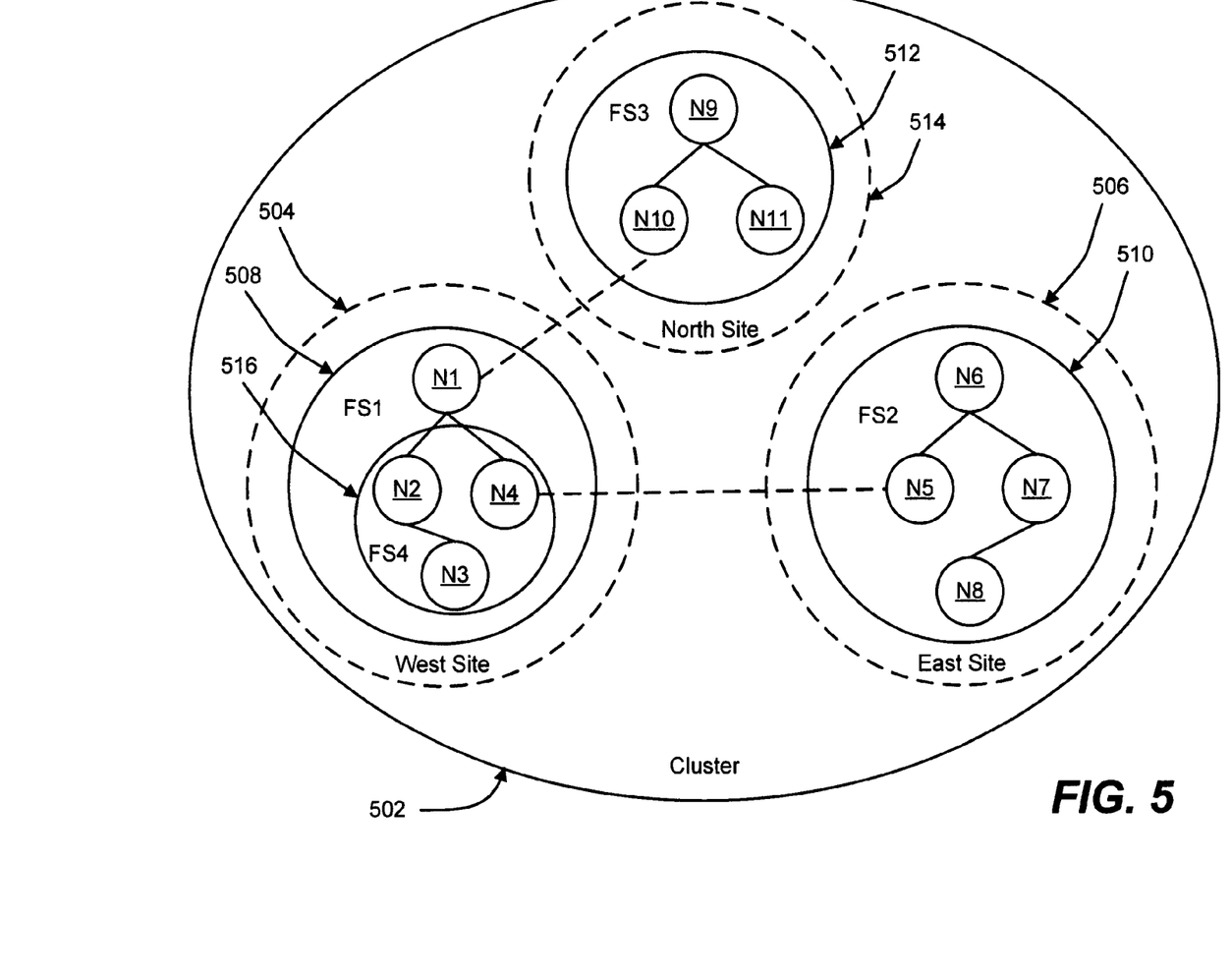
FIG. 5 is a block diagram generally representing an example cluster comprising three geographically separated sites and having defined failover scopes including one failover scope that contains a subset of the nodes of a site, in accordance with various aspects of the present invention.

Further, as represented in the cluster 502 of FIG. 5, a failover scope 516 (e.g., the fourth failover scope, FS4) may contain only a subset of the nodes of a site, e.g., only the nodes N2, N3 and N4 of the site 504 are identified in the failover scope FS4. As can be seen from the data structure 604 in FIG. 6, an attempt will not be made to failover the resource group RG2 to the node N1, because RG2 is associated with failover scope FS4, which does not contain the node N1, as well as the failover scope FS2.

Figure 6:
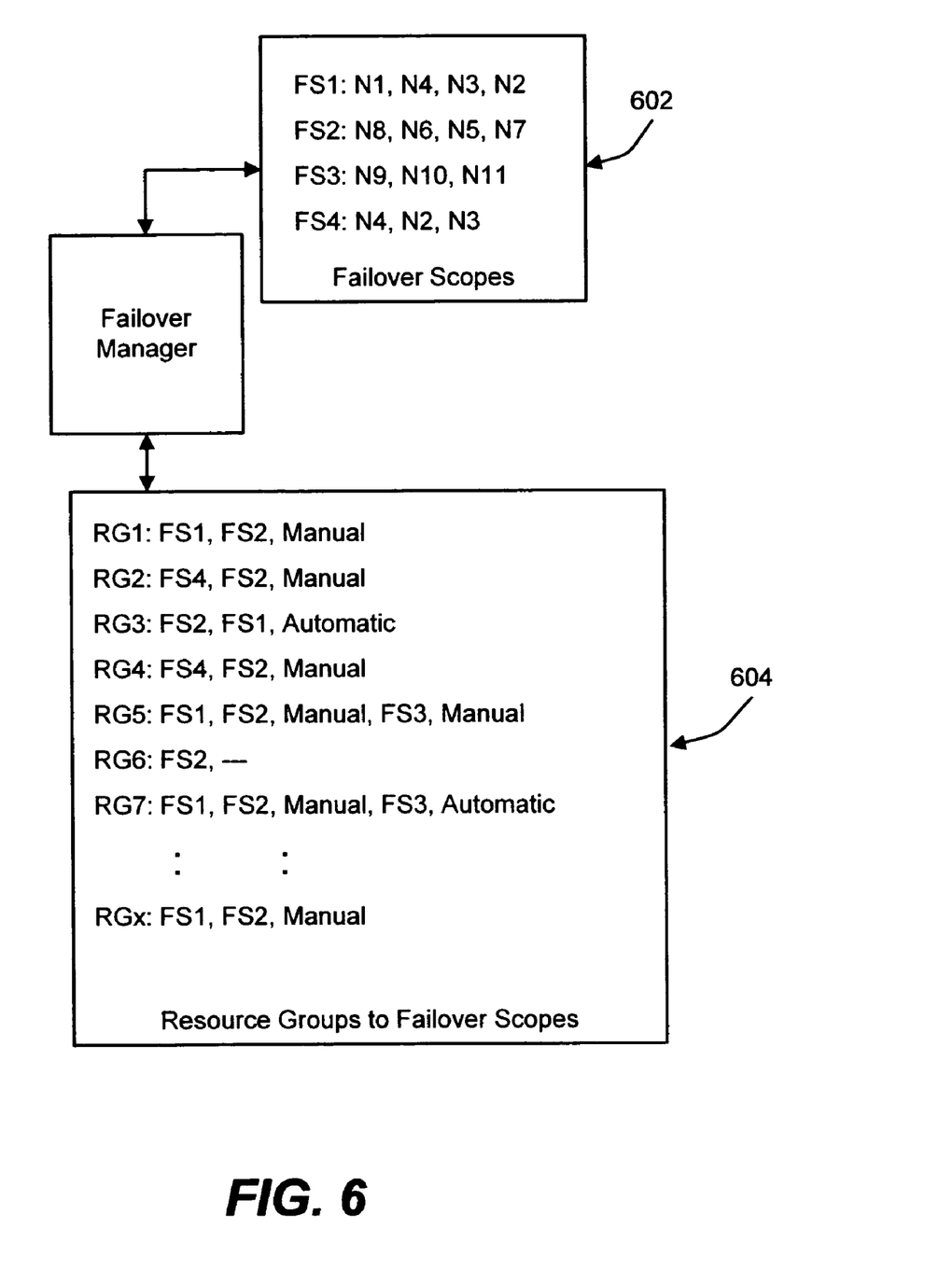
FIG. 6 is a representation of the failover scopes of FIG. 5 and resource groups association with the failover scopes, in accordance with various aspects of the present invention.

As further represented in FIG. 6, the manual or automatic flag is not necessarily per resource group, but instead may be per pair of failover scopes within each resource group. Thus, for example, the resource group RG5 fails over from failover scopes FS1 to FS2 with manual intervention, and then, if necessary, because no suitable or surviving node is found in failover scope FS2, from failover scopes FS2 to FS3, again manually because of the second manual flag. In contrast, the resource group RG7 fails over from failover scopes FS1 to FS2 with manual intervention, but then, if necessary, because no suitable or surviving node is found in failover scope FS2, automatically fails over from failover scopes FS2 to FS3, because of the second flag specifies automatic. This gives an administrator additional flexibility to choose whether manual should be selected a second time (e.g., because something is definitely wrong in the cluster) or whether to find another node in another failover scope (e.g., because it really does not matter as the cross-site failover expense is going to be incurred regardless). Note that alternative implementations may limit resource groups to only two failover scopes, or if more than two are allowed, to only one flag for the entire resource group even if three or more failover scopes are associated with that resource group.

As can be seen from the foregoing detailed description, there is provided a method and system that provide a flexible way for cluster administrators to manage the automatic actions that a cluster will take on failures. Administrators may specify a subset of cluster node or nodes to which resource groups may failover, which may be based on geographic sites.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method comprising:
   defining a failover scope corresponding to selected nodes within a cluster;
   associating the failover scope with a resource group;
   associating at least one other failover scope with the resource group;
   maintaining an ordering of the failover scopes associated with the resource group such that an attempt is made to failover the resource group to a node in a first failover scope before an attempt is made to failover the resource group a node in any other failover scope;
   wherein the attempt to failover the resource group to a node in a first failover scope is unsuccessful, and further comprising, accessing data that indicates whether manual intervention is necessary before attempting to failover the resource to a node of another failover scope; and
   failing over the resource group from one node to another node based on the failover scope associated with the resource group.

2. The method of claim 1 wherein defining the failover scope comprises defining at least part of the failover scope via an automatic process.

3. The method of claim 1 wherein defining the failover scope comprises receiving input from an administrator with respect to at least part of the failover scope.

4. The method of claim 1 wherein defining the failover scope comprises defining at least part of the failover scope to correspond to a site.

5. The method of claim 1 further comprising, detecting addition of a new node, and modifying the failover scope to include information corresponding to the new node.

6. The method of claim 1 further comprising, preventing intersection of nodes between failover scopes associated with the resource group.

7. The method of claim 1 wherein failing over the resource group from one node to another node comprises selecting the other node from among a plurality of candidate nodes in the failover scope.

8. The method of claim 7 wherein selecting the other node from among a plurality of candidate nodes is based on a random selection.

9. The method of claim 7 wherein selecting the other node from among a plurality of candidate nodes is based on meeting at least one criterion.

10. One or more computer-readable storage media having stored computer-executable instructions which when executed perform the method of claim 1.

11. In a computing environment, a method comprising:
defining a first failover scope corresponding to a first subset of nodes within a cluster;
defining a second failover scope corresponding to a second subset of nodes within a cluster;
associating the first and second failover scopes with a resource group; and
attempting to failover the resource group from one node to another node of the first failover scope, wherein the attempt to failover the resource group to a node in a first failover scope is unsuccessful, and further comprising, accessing data that indicates whether manual intervention is necessary before failing over the resource to a node of the second failover scope.

12. The method of claim 11 wherein the first and second subsets are non-intersecting.

13. The method of claim 11 further comprising, maintaining ordering information that indicates that the attempt to failover the resource group is made with the first subset of nodes identified within the first failover scope before any other attempt to failover the resource group.

14. The method of claim 11 wherein defining the first and second failover scopes comprises defining at least part of one of the failover scopes via an automatic process.

15. The method of claim 11 wherein defining the first and second failover scopes comprises receiving input from an administrator with respect to at least part of one of the failover scopes.

16. The method of claim 11 wherein defining the first failover scope comprises defining at least part of the first failover scope to correspond to a site.

17. The method of claim 11 further comprising, detecting addition of a new node, and modifying the first failover scope to include information corresponding to the new node.

18. The method of claim 11 further comprising associating a third failover scope with the resource group.

19. The method of claim 11 wherein the data indicates that manual intervention is necessary, and further comprising, awaiting manual intervention before failing over the resource to a node of the second failover scope.

20. The method of claim 11 wherein failing over the resource group from one node to another node comprises selecting the other node from among a plurality of candidate nodes in the failover scope.

21. The method of claim 20 wherein selecting the other node from among a plurality of candidate nodes is based on a random selection.

22. The method of claim 20 wherein selecting the other node from among a plurality of candidate nodes is based on meeting at least one criterion.

23. One or more computer-readable storage media having stored computer-executable instructions which when executed perform the method of claim 11.

24. One or more computer-readable storage media having stored thereon a plurality of related data structures, comprising:
a first data structure that includes a set of at least one failover scope, each failover scope associated with a node set identifying at least one node of a cluster;
a second data structure that identifies at least one resource group, the at least one identified resource group having an association with first and second failover scopes included in the first data structure and wherein the resource group is further associated with information that orders the first and second failover scopes such that the first resource group is a selected resource group; and
data associated with the resource group that indicates whether a failover to a node of a failure scope other than the selected failover scope requires manual intervention; and
wherein upon failure of a resource group identified in the second data structure, the second data structure is accessed to select an associated failover scope as a selected failover scope, and the first data structure is accessed to locate the node set corresponding to the selected failover scope such that the resource group may be failed over to a node identified in the selected failover scope.

25. The computer-readable media of claim 24 wherein the resource group identified in the second data structure is associated with at least two failover scopes included in the first data structure.

26. The computer-readable media of claim 24 wherein the first and second resource groups are maintained in the second data structure as a list associated with the identified resource group, and wherein the information that orders the first and second failover scopes comprise an ordering of the failover scopes in the list.

27. A computing system comprising:
a plurality of computing nodes;
a failover manager; and
storage media storing computer executable instructions which, when executed, implement the method recited in claim 1.

28. A computing system comprising:
a processor; and
memory storing computer executable instructions which, when executed by the processor, implement the method recited in claim 1.

29. A computing network system comprising:
a plurality of computing nodes;
a failover manager; and
storage media storing computer executable instructions which, when executed, implement the method recited in claim 11.

30. A computing system comprising:
a processor; and
memory storing computer executable instructions which, when executed by the processor, implement the method recited in claim 11.

* * * * *